United States Patent
Chalana et al.

(10) Patent No.: US 8,321,447 B2
(45) Date of Patent: Nov. 27, 2012

(54) ADAPTIVE QUERY THROTTLING SYSTEM AND METHOD

(75) Inventors: Vikram Chalana, Bothell, WA (US); Gurpreet Singh Sidhu, Chandigarh (IN); Vishal Chalana, Panchkula (IN)

(73) Assignee: Winshuttle, LLC, Bothell, WA (US)

( * ) Notice: Subject to any disclaimer, the term of this patent is extended or adjusted under 35 U.S.C. 154(b) by 378 days.

(21) Appl. No.: 12/716,162

(22) Filed: Mar. 2, 2010

(65) Prior Publication Data
US 2010/0223256 A1    Sep. 2, 2010

Related U.S. Application Data

(60) Provisional application No. 61/156,639, filed on Mar. 2, 2009.

(51) Int. Cl.
*G06F 17/30* (2006.01)

(52) U.S. Cl. ........................................................ 707/766

(58) Field of Classification Search .................. 707/718, 707/766
See application file for complete search history.

(56) References Cited

U.S. PATENT DOCUMENTS

| | | | |
|---|---|---|---|
| 5,689,697 A | 11/1997 | Edwards et al. | |
| 6,363,391 B1 | 3/2002 | Rosensteel | |
| 2005/0174938 A1 | 8/2005 | Richardson et al. | |
| 2006/0026154 A1 | 2/2006 | Altinel et al. | |
| 2006/0074872 A1 | 4/2006 | Gordon | |
| 2006/0080285 A1* | 4/2006 | Chowdhuri | 707/3 |
| 2006/0167842 A1* | 7/2006 | Watson | 707/3 |
| 2006/0190243 A1* | 8/2006 | Barkai et al. | 704/8 |
| 2007/0061375 A1* | 3/2007 | Brown et al. | 707/200 |

* cited by examiner

*Primary Examiner* — James Trujillo
*Assistant Examiner* — Amresh Singh
(74) *Attorney, Agent, or Firm* — Æ ON Law; Adam L. K. Philipp (57) ABSTRACT

An adaptive query throttling system and method are provided herein.

15 Claims, 6 Drawing Sheets

ADAPTIVE QUERY THROTTLING SYSTEM AND METHOD

CROSS REFERENCE TO RELATED APPLICATIONS

This application claims the benefit of priority to U.S. Provisional Application No. 61/156,639, filed Mar. 2, 2009, titled "ADAPTIVE QUERY THROTTLING," naming inventors Vikram Chalana, Vishal Chalana, and Gurpreet Singh Sidhu. The above-cited application is incorporated herein by reference in its entirety, for all purposes.

FIELD

The present invention relates to databases, and more particularly for a method of adaptively throttling database queries.

BACKGROUND

Enterprise resource planning ("ERP") systems are designed to coordinate some or all of the resources, information, and activities needed to complete business processes. An ERP system may support business functions including some or all of manufacturing, supply chain management, financials, projects, human resources, customer relationship management, and the like. In addition, an ERP system may facilitate and/or record data relating to live transactions, so in many cases, a business may require that its ERP system continuously perform well enough that live transactions can be processed in a timely fashion.

Many ERP systems incorporate a centralized database or other ERP data store, and many ERP vendors provide one or more reporting tools that can be used to access the ERP data store. However, it can be difficult and expensive to use vendor-provided reporting tools. Consequently, many businesses must maintain an expensive information technology ("IT") to facilitate custom report creation. In many cases, creating a custom report may cost thousands of dollars to an enterprise running an ERP system.

In addition, generating reports directly from an ERP data store can compromise performance and security of the ERP data store. For example, generating a report may involve running a complex, inefficient, and/or badly-formed query against the ERP data store, which could at least temporarily hinder the ERP data store's ability to facilitate live transactions. In part to prevent report generation from hindering transaction performance, many businesses generate reports using data from a "data warehouse," which may be updated from the ERP data store periodically (e.g., once a day, often overnight or during other times when the ERP data store is relatively not busy). However, data in such a data warehouse may not always reflect the most recent transactions. Moreover, maintaining a discrete data warehouse may be expensive.

Similar difficulties may arise with non-ERP database systems as well.

DESCRIPTION

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Database users may wish to build reports that query data from a live ERP data store and/or other live database without the query impairing performance and/or security of the live ERP data store and/or other live database.

Figure 1:
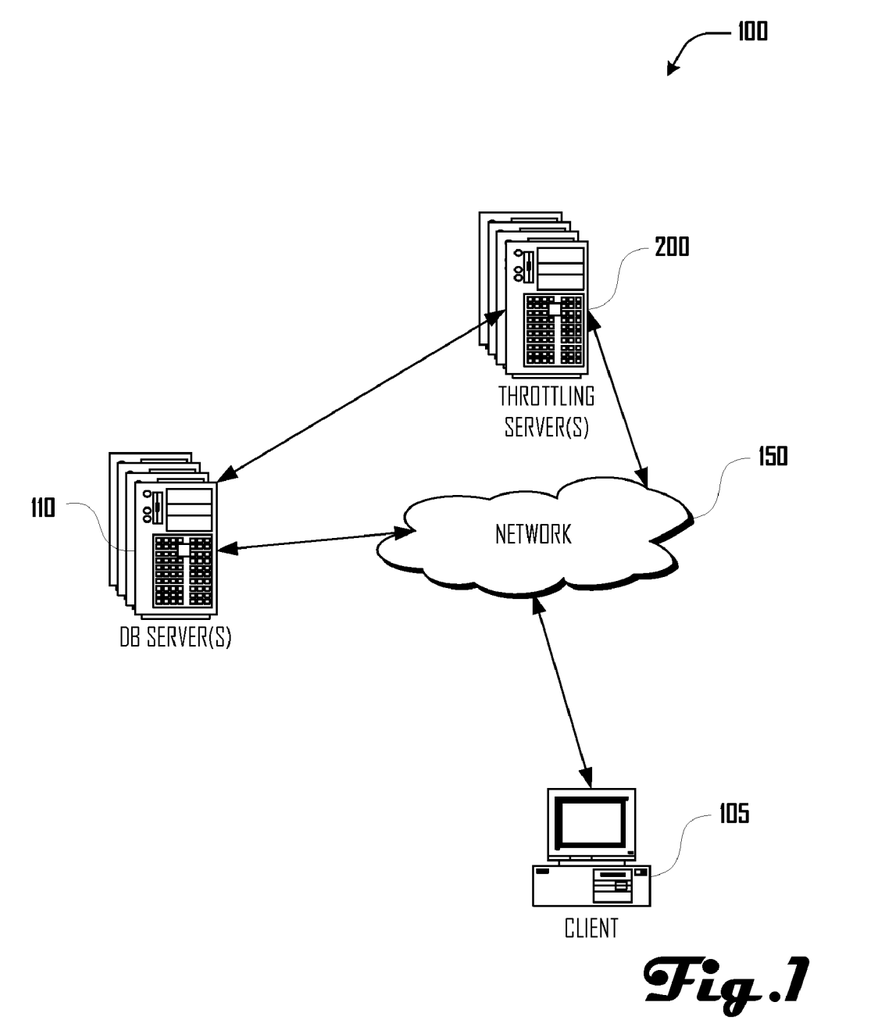
FIG. 1 is a system diagram of a number of devices in a network in accordance with one embodiment.

FIG. 1 illustrates an exemplary ERP system 100 in which a client device 105, one or more Throttling Server(s) 200 and one or more DB Server(s) 110 are connected to a network 150. In many embodiments, Throttling Server(s) 200 and DB Server(s) 110 comprise an ERP data store. In other embodiments, Throttling Server(s) 200 and DB Server(s) 110 may comprise any other database and/or database management system ("DBMS"). In some embodiments, DB Server(s) 110 may further comprise an application server (not shown), and/or DB Server(s) 110 may further include the functionality of an application server. In some embodiments, Throttling Server(s) 200 and DB Server(s) 110 may be incorporated into a single logical or physical device.

In various embodiments, Throttling Server(s) 200 may provide a "front-end," user interface, and/or data query routines by which a client 105 may obtain data from DB Server(s) 110. In some embodiments, client 105 may also access data from DB Server(s) 110 directly. In other embodiments, some or all of client 105, Throttling Server(s) 200, and DB Server(s) 110 may all be incorporated into a single device.

In various embodiments, network 150 may include the Internet, a local area network ("LAN"), a wide area network ("WAN"), and/or other data network. In some embodiments, Throttling Server(s) 200 and DB Server(s) 110 may be the same device. In other embodiments, Throttling Server(s) 200 and DB Server(s) 110 may communicate with one another via a channel other than network 150. For example, Throttling Server(s) 200 and DB Server(s) 110 may be connected via a storage area network ("SAN"), a high speed serial bus, and/or via other suitable communication technology. In many embodiments, there may be multiple client devices 105.

Figure 2:
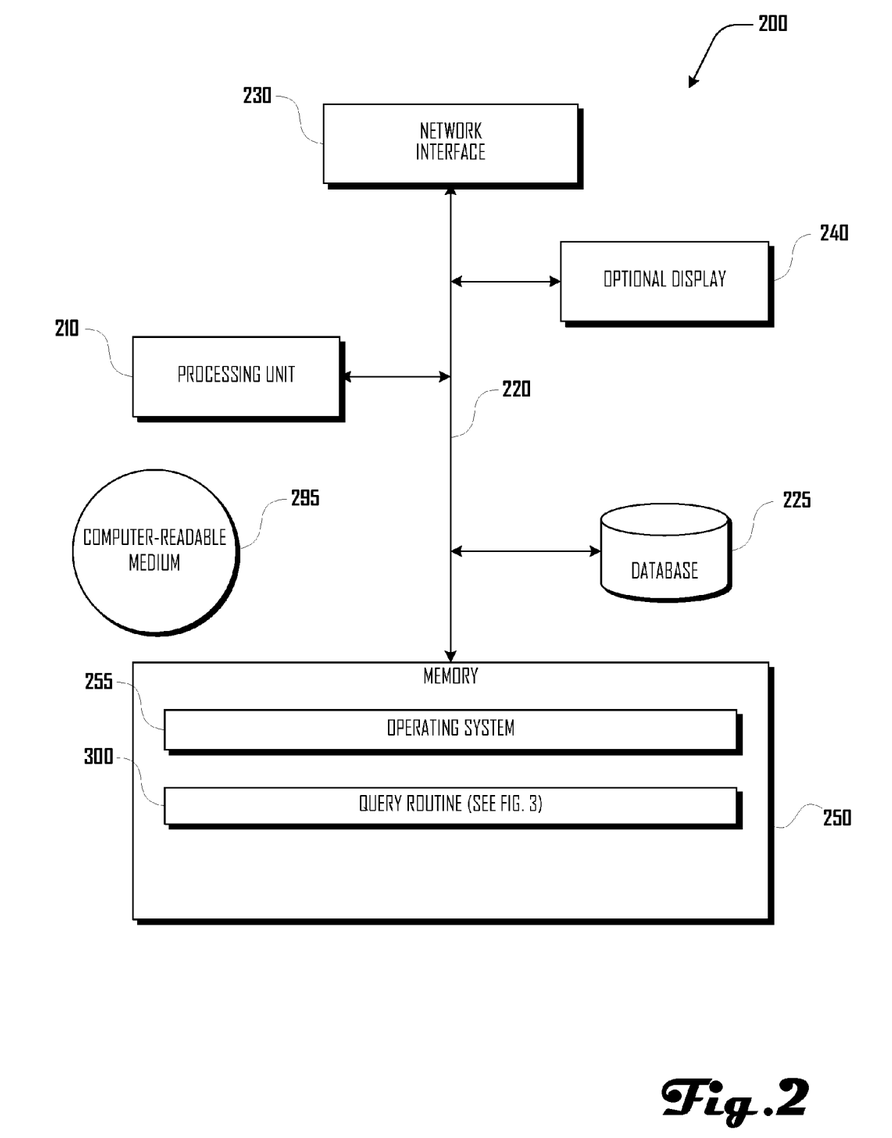
FIG. 2 is a block diagram of an appliance that provides an exemplary operating environment for one embodiment.

FIG. 2 illustrates several components of an exemplary Throttling Server(s) 200. In some embodiments, Throttling Server(s) 200 may include many more components than those shown in FIG. 2. However, it is not necessary that all of these generally conventional components be shown in order to disclose an illustrative embodiment. As shown in FIG. 2, the Throttling Server(s) 200 includes a network interface 230 for connecting to the network 150.

The Throttling Server(s) 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for adaptive query subroutine 400. In addition, the memory 250 also stores an operating system 255. These software components may be loaded from a computer readable storage medium 295 into memory 250 of the Throttling Server(s) 200 using a drive mechanism (not shown) associated with a computer readable storage medium, such as a floppy disc, tape, DVD/CD-ROM drive, memory card, or the like. In some embodiments, software components may also be loaded via the network interface 230, rather than via a computer readable storage medium 295.

Throttling Server(s) 200 also communicates via bus 220 with a database component 225, such as DB Server(s) 110. Throttling Server(s) 200 may communicate with the database component 225 via the network interface 230, a storage area network ("SAN"), a high speed serial bus, and/or via other suitable communication technology.

Although an exemplary Throttling Server(s) 200 has been described that generally conforms to conventional general purpose computing devices, an Throttling Server(s) 200 may be any of a great number of devices capable of communicating with the network 150 and/or DB Server(s) 110, for example, a personal computer, a game console, a set-top box, a handheld computer, a cell phone, or any other device that is capable of accessing a database and/or other data store.

Figure 3:
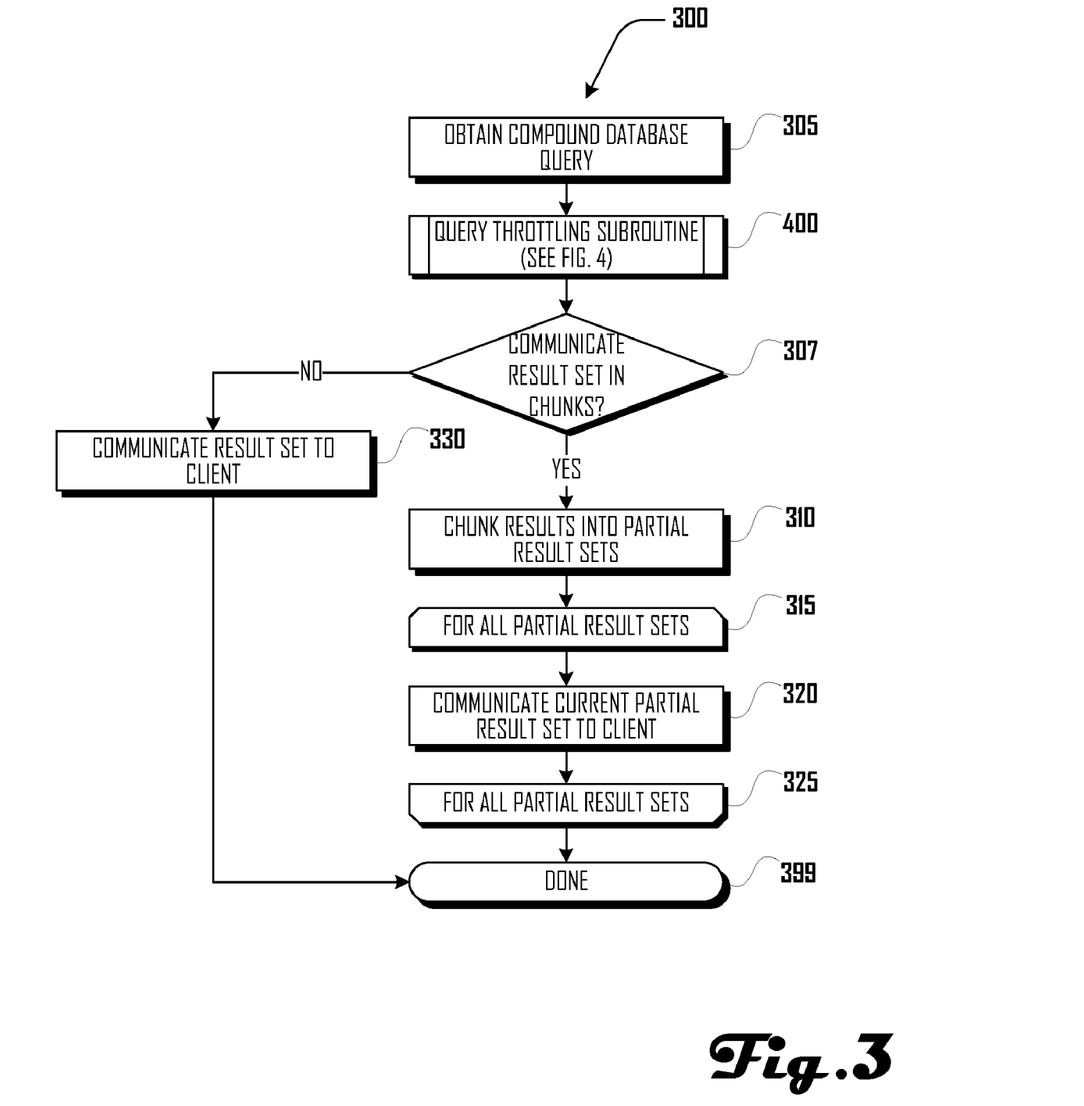
FIG. 3 is a flow diagram illustrating an adaptive query routine in accordance with one embodiment.

FIG. 3 illustrates an adaptive query routine 300. In various embodiments, some or all operations illustrated in FIGS. 3 and 4 may take place on a single device. In other embodiments, operations illustrated in FIGS. 3 and 4 may be distributed among one or more devices. In one embodiment, adaptive query routine 300 and query throttling subroutine 400 are performed substantially by Throttling Server(s) 200, which retrieves data from one or more local or remote databases, such as DB Server(s) 110.

Adaptive query routine 300 obtains a compound database query in block 305. In many embodiments, the query may be written in a query language, such as Structured Query Language ("SQL") and/or an SQL variant or extension. In other embodiments, query may comprise a statement in an alternate query language, such as Common Query Language, Datalog, Entity Relationship Role Oriented Language ("ERROL"), XQuery, XPath, XSQL, and the like.

In various embodiments, the query may comprise a "SELECT query." As used herein, the term "SELECT query" refers to a query language statement that specifies a result set of records from one or more tables. In many query languages, including SQL, a SELECT query may be written using the statement "SELECT." Other query languages may use other commands or keywords to describe a SELECT query (i.e., a statement that specifies a result set of records from one or more tables). In various query languages, a SELECT statement may include various clauses to specify which rows to retrieve (e.g., a WHERE clause), how to group rows, how to order results, how to join records from multiple tables (e.g., a JOIN clause), and other similar clauses.

For the sake of clarity and simplicity, in the remainder of this document, query language concepts will be discussed using SQL-like syntax and keywords. However, the disclosures are equally applicable to any query language, and various embodiments may use alternate syntaxes and/or query languages, as appropriate.

In some embodiments, Throttling Server(s) 200 may provide a user interface to facilitate creation of the query. In other embodiments, a user may write a query and submit it to Throttling Server(s) 200. In still other embodiments, the query may be obtained by any other suitable method. In various embodiments, individual users of an ERP system or other database system may create queries to generate custom reports that may incorporate up-to-date, live transactional data without significantly impeding the database's performance for other users and other operations. In some embodiments, such functionality may reduce the need for a business to maintain an IT infrastructure dedicated to creating custom reports.

In many embodiments, Throttling Server(s) 200 may provide additional functionality. For example, in one embodiment, Throttling Server(s) 200 may also enforce user access controls, permissions, granular subschemas, and/or other data security measures, including in some embodiments authenticating and/or authorizing a user via password or other credential. For example, in one embodiment, a database may contain a comprehensive set of employee data, but Throttling Server(s) 200 may enforce access controls such that one group of users may be authorized to view only one subset of data (e.g., payroll data), while others are allowed access to only a second subset of data (e.g., work history and/or medical data).

Figure 4:
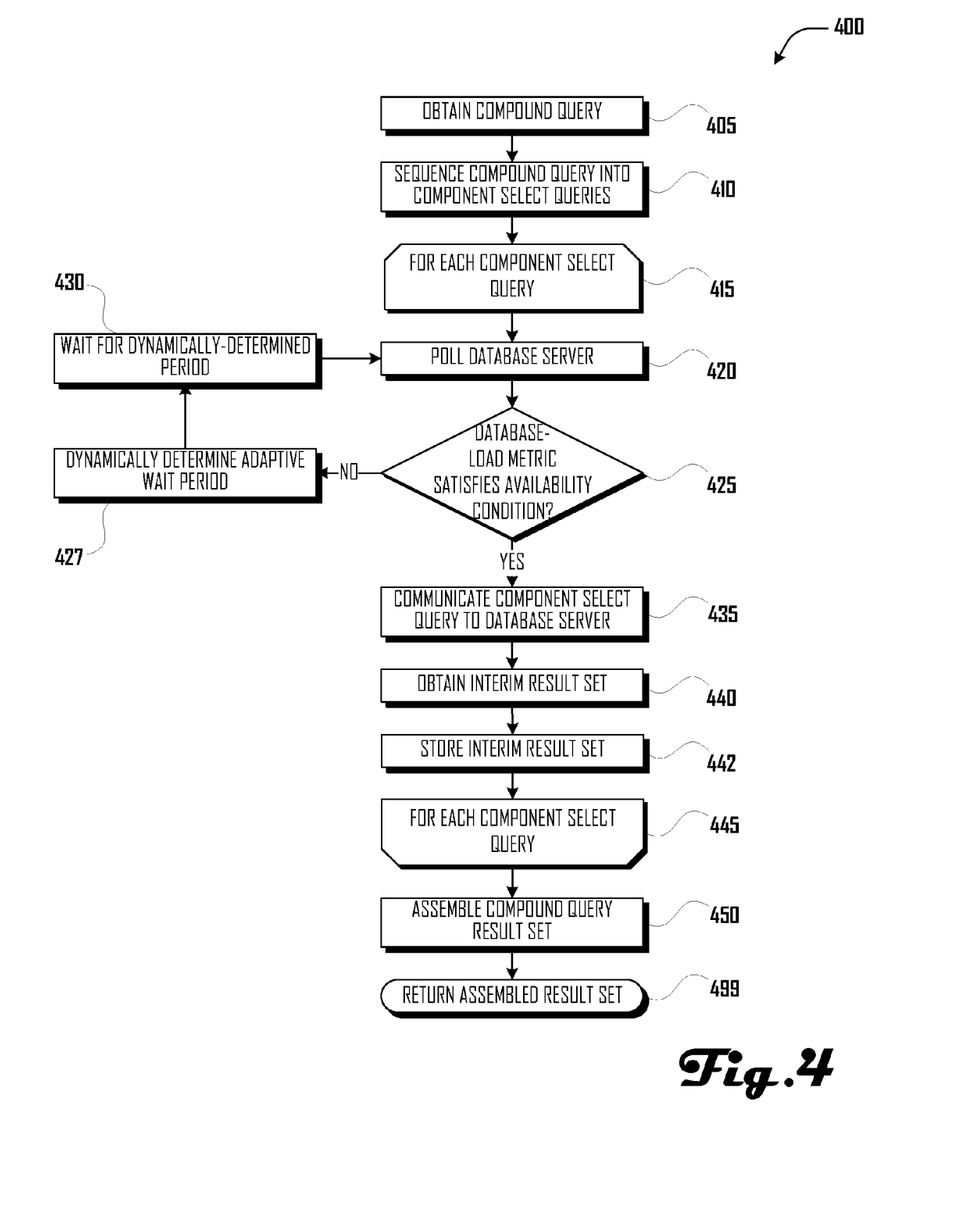
FIG. 4 is a flow diagram illustrating a query throttling routine in accordance with one embodiment.

Adaptive query routine 300 submits the query to query throttling subroutine 400, as illustrated in FIG. 4 and discussed below. Once a set of results has been obtained from query throttling subroutine 400, adaptive query routine 300 determines in block 307 whether to communicate the result set to client 105 in chunks. In some embodiments, if the size of the result set exceeds a threshold and/or if the time to communicate the result set to client 105 exceeds a threshold, adaptive query routine 300 may in block 310 chunk the result set into a number of partial result sets. From beginning block 315 to ending block 325, adaptive query routine 300 may iteratively communicate each partial result set to client 105 in block 320.

If in decision block 307, adaptive query routine 300 determines not to communicate the result set in chunks, then in block 330, adaptive query routine 300 communicates the result set to client 105. Adaptive query routine 300 ends at block 399.

FIG. 4 illustrates a query throttling subroutine 400 in accordance with one embodiment. Subroutine 400 obtains a compound query at block 405. In many cases, the compound query may be a relatively complex query describing records selected from many different tables. In SQL, records from different tables are combined via a "JOIN" clause. Other query languages may use other commands to accomplish a similar result. SQL and other query languages describe multiple JOIN variants, including INNER, OUTER, SELF, LEFT, RIGHT, and various combinations thereof.

In block 410, the compound query is sequenced into one or more component SELECT queries. This sequencing is related to, but distinct from, a process commonly referred to as "query optimization." (Many query languages, including SQL, are "non-procedural," meaning that the compound query specifies a result set, but does not specify how to calculate it. In many database systems, a "query optimizer" translates a non-procedural query into a "query plan," or a specific set of steps used to access or modify information in a database.) In various embodiments, query throttling subroutine 400 may borrow various query optimization methods and/or techniques, the borrowed methods and/or techniques being utilized to sequence the compound query into one or more "component SELECT queries."

As used herein, the term "component SELECT queries" refers to a plurality of SELECT queries that when performed in at least one determined order, obtain a plurality of interim result sets from which the result set specified in the compound query (the "compound query result set") can be assembled.

Figure 6:
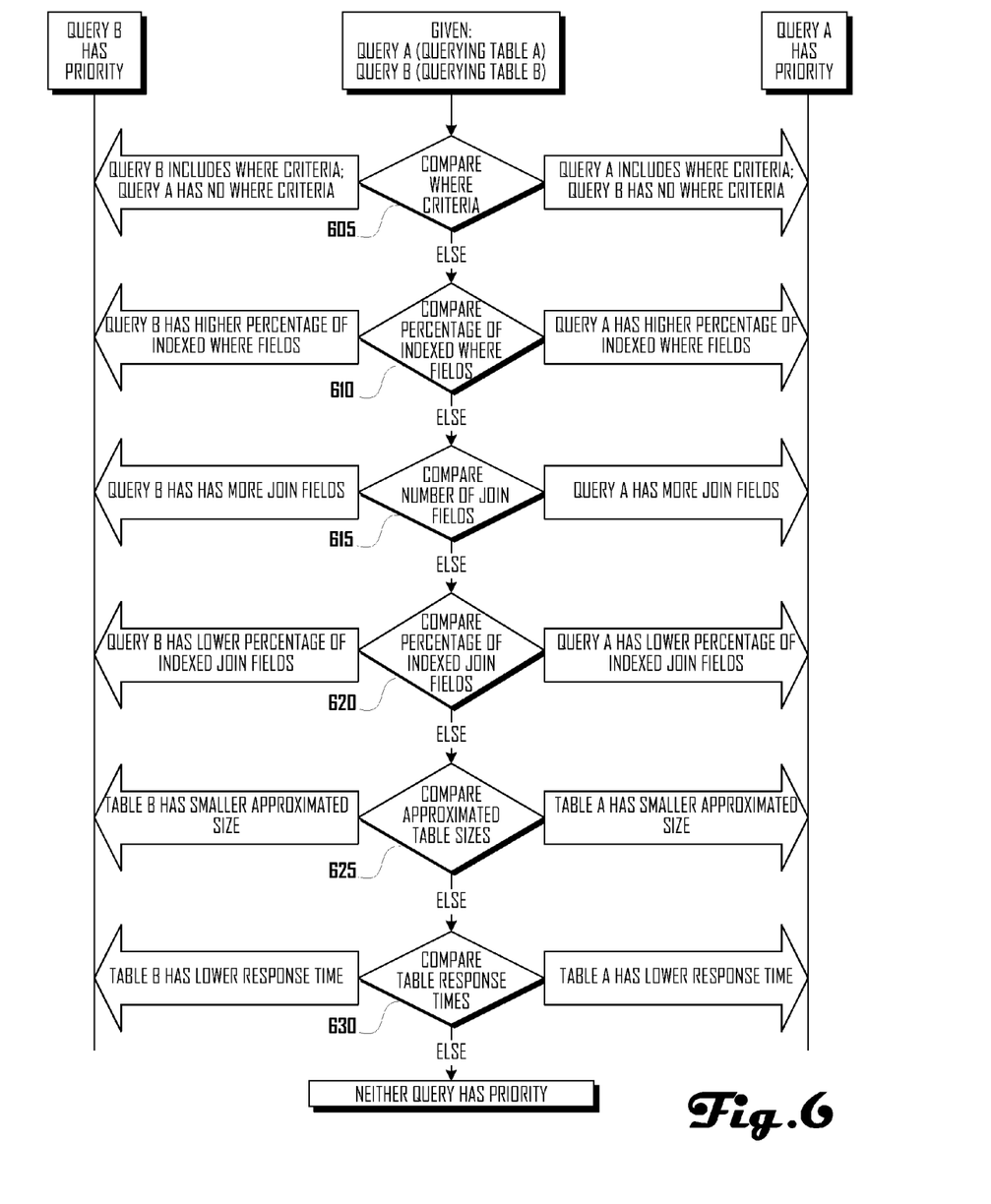
FIG. 6 is a diagram illustrating a chain of component select query prioritization rules in accordance with one embodiment.

In many embodiments, component SELECT queries (whether atomic or otherwise) are determined and sequenced according to various factors, including tables existing inside and outside of WHERE clauses, tables paired with JOINS, output/display fields, fields used in JOINS, and the like. FIG. 6, discussed below, illustrates an exemplary chain of component SELECT query prioritization rules that may in some embodiments be used at least in part to determine an order for component SELECT queries.

In some embodiments, a component SELECT query may be an "atomic query." As used herein, the term "atomic query" refers to a SELECT statement having a result set consisting of a single field from a single table, selected according to a single criterion. In other embodiments, a component SELECT query may be more complex than an atomic query, but in most embodiments, a component SELECT query describes a result set including rows from only a single table. In many embodiments, a component SELECT query may be simple enough that its execution causes only minimal performance degradation, even on a live transactional database.

In most embodiments, sequencing a compound query into a plurality of component SELECT queries does not replace the query optimization process that ordinarily takes place when a non-procedural query is executed. Similarly, the sequenced ordered plurality of component SELECT queries does not constitute a "query plan" as that term is ordinarily understood by those skilled in the art. On the contrary, the process of sequencing a compound query into a plurality of component SELECT queries may often be viewed as a "preprocessing" operation prior to query optimization. Indeed, in many embodiments, the database may further optimize and/or form a query plan for each individual component SELECT query before performing the component SELECT query.

In accordance with various embodiments, once a sequence of component SELECT queries is determined, the compound query result set may not be obtained all at once. Such an approach is likely to excessively load the database, as the sequence of component SELECT queries, if executed as a group, may still be so resource-intensive that its execution is likely to hinder other time-sensitive operations the database may need to perform during that time.

To obtain the results described in the compound query without excessively degrading the transactional performance of the database, query throttling subroutine 400 periodically polls DB Server(s) 110 to monitor one or more database-load metrics and then serially performs each individual component SELECT query one at a time, generally at full-speed, but only when the database has sufficient resources available. Put another way, in accordance with various embodiments, the result set specified by the compound query is obtained in components, which "trickle in" as resources become available at the database. Thus, obtaining the compound query result set is adaptively "throttled," such that reporting queries may often be performed on a "live" dataset without compromising the database's time-sensitive transactional operations (if any).

In various embodiments, this adaptive throttling takes place between beginning loop block 415 and ending loop block 445. In this loop, query throttling subroutine 400 iterates over each component SELECT query. In block 420, query throttling subroutine 400 polls DB Server(s) 110 to determine a current database-load metric. In decision block 425, query throttling subroutine 400 determines whether the current database-load metric satisfies a predetermined availability condition. If the availability condition is not satisfied, query throttling subroutine 400 dynamically determines an adaptive wait period in block 427 and waits for the determined period in block 430 before again polling DB Server(s) 110 in block 420.

In an exemplary embodiment, the database-load metric polled in block 420 may relate to a count of processes that are currently utilized or available at the database. In other embodiments, the database-load metric may alternatively or additionally correspond to one or more other factors, including processor and/or memory utilization at the database, a time of day, and the like.

Figure 5:
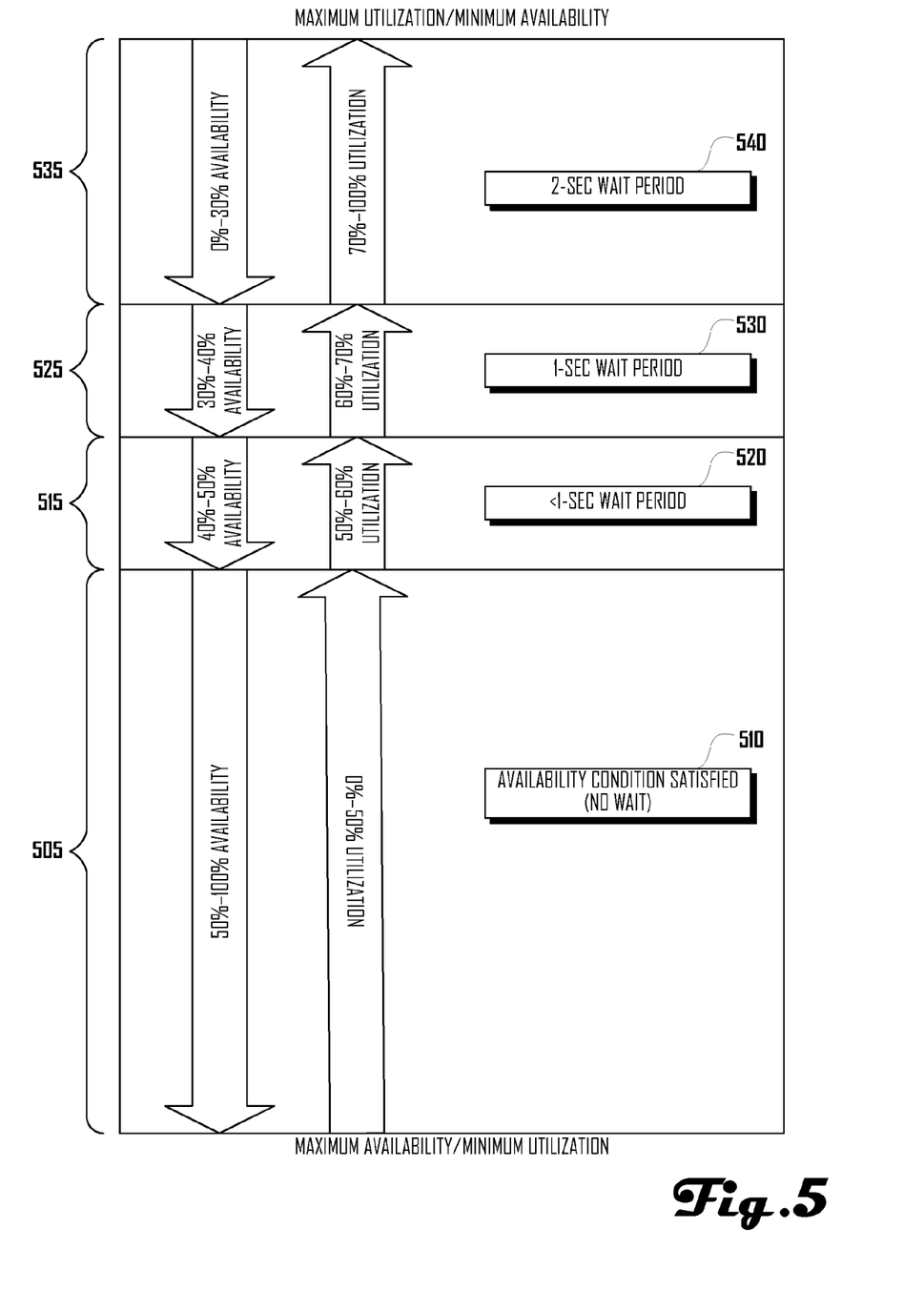
FIG. 5 is a diagram illustrating adaptive wait periods determined according to a database-load metric in accordance with one embodiment.

As illustrated in FIG. 5, in one embodiment, the database-load metric may correspond to a percentage (or other degree) of availability or utilization at DB Server(s) 110. When availability exceeds about 50% or (equivalently) utilization is below about 50% 505, the availability condition may be satisfied 510. When availability is between about 40-50% or utilization is between about 50-60% 515, the adaptive wait period may be very brief, less than 1 second 520. When availability is between about 30-40% or utilization is between about 60-70% 525, the adaptive wait period may be about 1 second 530. When availability is between about 0-30% or utilization is between about 70-100% 535, the adaptive wait period may be about 2 seconds 540. In other embodiments, longer and/or shorter wait periods may correspond to similar or different availability/utilization ranges. In still other embodiments, static (non-adaptive) wait periods may be used (e.g., wait N seconds whenever the availability condition is not satisfied).

In embodiments including enterprise resource planning (ERP) systems from SAP AG of Walldorf, Germany, the database-load metric may correspond to the number of DIALOG processes utilized or available at DB Server(s) 110. For example, in one embodiment, the maximum number of DIALOG processes that can be utilized may be 100 (or another number) and the minimum number of DIALOG processes that can be utilized may be 0 (or another number), and adaptive wait periods may be determined according to a percentage of available/utilized DIALOG processes as disclosed in FIG. 5.

Referring again to FIG. 4, when the current database-load metric is determined in block 425 to satisfy the availability condition, in block 435, query throttling subroutine 400 communicates the component SELECT query to the database to be executed. In many embodiments, before executing the component SELECT query, the database will further optimize the component SELECT query and/or form a query plan according to the component SELECT query.

In various embodiments, query throttling subroutine 400 may communicate the component SELECT query to the database in various ways. For example, in some embodiments, query throttling subroutine 400 may communicate with the database via a standard software application programming interface ("API"), such as Open Database Connectivity ("ODBC"); a language-specific API, such as Java Database Connectivity ("JDBC"); a DBMS-specific API, such as TransactSQL; a vendor-provided API; and the like. In some embodiments, a timeout parameter may be set so that the component SELECT query will terminate if its execution time exceeds the timeout parameter.

In block 440, query throttling subroutine 400 obtains the interim result set described by the component SELECT query. In block 442, query throttling subroutine 400 stores the interim result set in an interim memory. In block 445, query throttling subroutine 400 iterates back to block 415 to wait (if necessary) and process the next component SELECT query. Once query throttling subroutine 400 has iterated over all component SELECT queries, in block 450, query throttling subroutine 400 assembles the interim result sets (that were stored in iterations of block 442) into the result set specified by the compound query. The assembled result set is returned at block 499.

FIG. 6 illustrates a chain of component select query prioritization rules in accordance with one embodiment. Given a component SELECT query "A," which queries table "A," and a component SELECT query "B," which queries table "B," some or all of prioritization rules 605-630 may be employed (in the illustrated order, or another order) to determine whether component SELECT query A has priority over component SELECT query B (and thus, whether component SELECT query A should be communicated to the database for optimization and execution before component SELECT query B).

According to prioritization rule 605, queries having WHERE criteria have priority over queries that lack WHERE criteria. When queries cannot be prioritized according to rule 605, then according to prioritization rule 610, component SELECT queries are prioritized in descending order according to what percentage of their WHERE fields are indexed in the database. For example, in database "foo" having indexed fields "bar" and "baz" and non-indexed field "bat," query A, "SELECT * from foo WHERE bar=1", has 100% indexed WHERE fields, and query B, "SELECT * from foo WHERE baz=2 AND bat=3", has 50% indexed WHERE fields; therefore, according to rule 610, query A has higher priority than query B.

When queries cannot be prioritized according to rule 610, then according to prioritization rule 615, component SELECT queries are prioritized in descending order according to the number of JOIN fields included in the query. When queries cannot be prioritized according to rule 615, then according to prioritization rule 620, component SELECT queries are prioritized in ascending order according to what percentage of their JOIN fields are indexed in the database. When queries cannot be prioritized according to rule 620, then according to prioritization rule 625, component SELECT queries are prioritized in ascending order according to approximations of their tables sizes. When queries cannot be prioritized according to rule 625, then according to prioritization rule 630, component SELECT queries are prioritized in ascending order according to their table response times. When queries cannot be prioritized according to rule 630, the queries have equivalent priorities. In other embodiments, more, fewer, and/or different prioritization rules may be used in the illustrated order or in a different order.

Although specific embodiments have been illustrated and described herein, it will be appreciated by those of ordinary skill in the art that a whole variety of alternate and/or equivalent implementations may be substituted for the specific embodiments shown and described without departing from the scope of the present invention. This application is intended to cover any adaptations or variations of the embodiments discussed herein.

What is claimed is:

1. A computer-implemented method for adaptively throttling a database query, the method comprising:
   obtaining, by a throttling server, a compound database query describing at least one result row from a database, said at least one result row being selected according to specified criteria from a specified plurality of database tables;
   sequencing, by said throttling server, said compound database query into an ordered plurality of component select queries, each component select query describing at least one interim result row from only one of said specified plurality of database tables;
   adaptively throttling said compound database query by performing steps i-iv by said throttling server for each of said ordered plurality of component select queries:
   i. periodically polling a database server until a current database-load metric satisfies an availability condition;
   ii. when said current database-load metric satisfies said availability condition, communicating the current component select query to said database server;
   iii. obtaining from said database server a current interim result set comprising at least one current interim result row corresponding to the current component select query; and
   iv. storing said current interim result set in an interim memory; and
   obtaining a plurality of interim result sets from said interim memory, said plurality of interim result sets corresponding respectively to said ordered plurality of component select queries; and
   assembling, by said throttling server, said at least one result row according to said plurality of interim result sets.

2. The method of claim 1, wherein said database comprises a live transactional database.

3. The method of claim 1, wherein communicating the current component select query to said database server further comprises translating the current component select query into a query plan.

4. The method of claim 1, wherein communicating the current component select query to said database server comprises communicating the current component select query to said database server for optimization and execution.

5. The method of claim 1, wherein sequencing said compound database query into said ordered plurality of component select queries comprises ordering said plurality of component select queries according to a plurality of prioritization rules.

6. The method of claim 5, wherein said plurality of prioritization rules comprises at least one of prioritization rules i-vi:
   i) perform a component select query including at least one WHERE criterion before a component select query including no WHERE criteria;
   ii) perform a component select query having a higher percentage of indexed WHERE fields before a component select query having a lower percentage of indexed WHERE fields;
   iii) perform a component select query having a higher count of JOIN fields before a component select query having a lower count of JOIN fields;

iv) perform a component select query having a lower percentage of indexed JOIN fields before a component select query having a higher percentage of indexed JOIN fields;
v) perform a component select query querying a smaller table before a component select query querying a larger table, according to approximations of queried-table sizes; and
vi) perform a component select query querying a table having a lower response time before a component select query querying a table having a higher response time.

7. The method of claim 6, wherein said plurality of prioritization rules comprises prioritization rules i-vi, in order of precedence.

8. The method of claim 1, wherein periodically polling said database server until said current database-load metric satisfies an availability condition comprises:
obtaining said current database-load metric from said database server;
determining that said current database-load metric fails to satisfy said availability condition;
dynamically determining a wait-period according to said current database-load metric; and
waiting for the dynamically-determined wait period before polling for another database-load metric.

9. The method of claim 8, wherein said current database-load metric comprises a count of DIALOG processes that are currently available or currently utilized at said database server.

10. The method of claim 9, wherein said availability condition comprises at least one of a predetermined minimum number of DIALOG processes being currently available, a predetermined maximum number of DIALOG processes being currently utilized, a predetermined minimum percentage of DIALOG processes being currently available, and a predetermined maximum percentage of DIALOG processes being currently utilized.

11. The method of claim 9, further comprising obtaining a predetermined maximum number of DIALOG processes, wherein said availability condition comprises at least about 50% of said predetermined maximum number of DIALOG processes being currently available, and wherein dynamically determining said wait-period according to said current database-load metric comprises at least one of:
determining a wait-period of about 2-seconds when no more than about 30% of said predetermined maximum number of DIALOG processes are available;
determining a wait-period of about 1-second when no more than about 40% of said predetermined maximum number of DIALOG processes are available; and
determining a wait-period of less than 1-second when no more than about 50% of said predetermined maximum number of DIALOG processes are available.

12. The method of claim 1, further comprising communicating said assembled at least one result row to a client device.

13. The method of claim 12, wherein communicating said assembled at least one result row to said client device comprises:
chunking said assembled plurality of result rows into a plurality of partial result sets; and
communicating each of said plurality of partial result sets in serial to said client device.

14. A non-transitory computer-readable storage medium having stored thereon instructions that, when executed by a processor, perform the method of any one of claim 1, claim 5, or claim 8.

15. An apparatus including a processor and a memory, the memory having stored therein instructions that, when executed by the processor, perform the method of any one of claim 1, claim 5, or claim 8.

* * * * *